Feb. 24, 1948.  C. L. AVERY  2,436,372
TURBINE GATE LATCH MECHANISM
Filed June 10, 1944  2 Sheets-Sheet 1

INVENTOR
Clarence L. Avery
By Carlson, Pitzner, Hubbard & Wolfe
ATTORNEYS

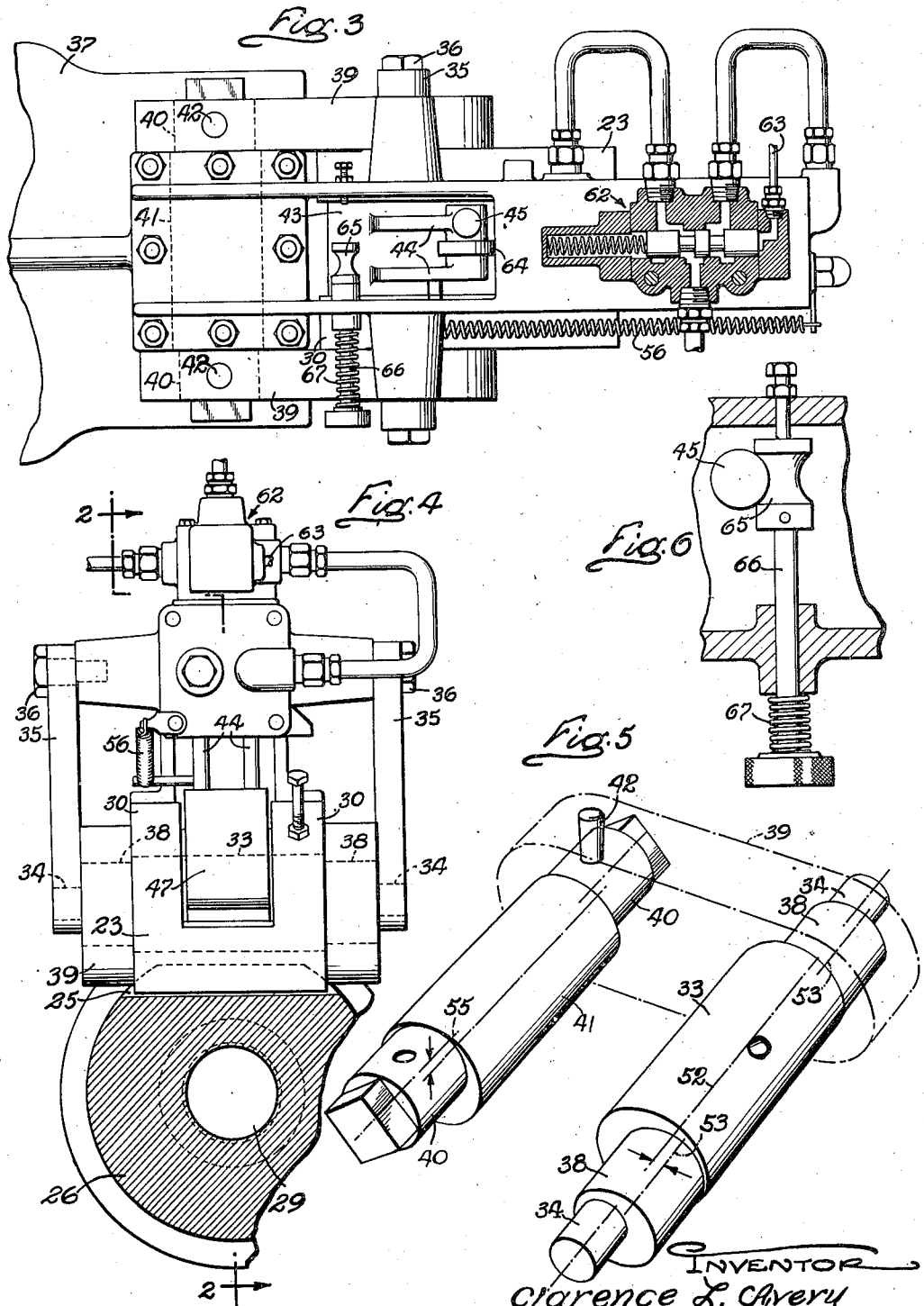

Patented Feb. 24, 1948

2,436,372

UNITED STATES PATENT OFFICE 2,436,372

TURBINE GATE LATCH MECHANISM

Clarence L. Avery, Rockford, Ill., assignor to Woodward Governor Company, Rockford, Ill., a corporation of Illinois Application June 10, 1944, Serial No. 539,775

9 Claims. (Cl. 253—122)

This invention relates generally to mechanism for latching the gates of a water wheel in closed position, and the general object is to provide a mechanism which is readily adjustable to the fully closed position of the gates, which is easily releasable manually, and which is simple in construction and reliable in operation.

Another object is to provide a novel mounting by which the gate latch is backed away and freed for movement automatically as an incident to application of a force to release the latch.

A further object is to provide a latch mechanism which will engage and become effective automatically as the gates become fully closed.

The invention resides in the novel character of the structure for releasing and adjusting the latch.

Other objects and advantages of the invention will become apparent from the following detailed description taken in connection with the accompanying drawings, in which Figure 1 is a fragmentary view of a water turbine equipped with a latch mechanism embodying the present invention.

Fig. 3 is a plan view of the latch mechanism.

Fig. 4 is an end view of the latch mechanism, partially sectional along the line 4—4 of Fig. 2.

Fig. 5 is a perspective view of part of the latch adjusting mechanism.

Fig. 6 is a fragmentary plan view of the retainer for the latch actuator.

Figure 1:
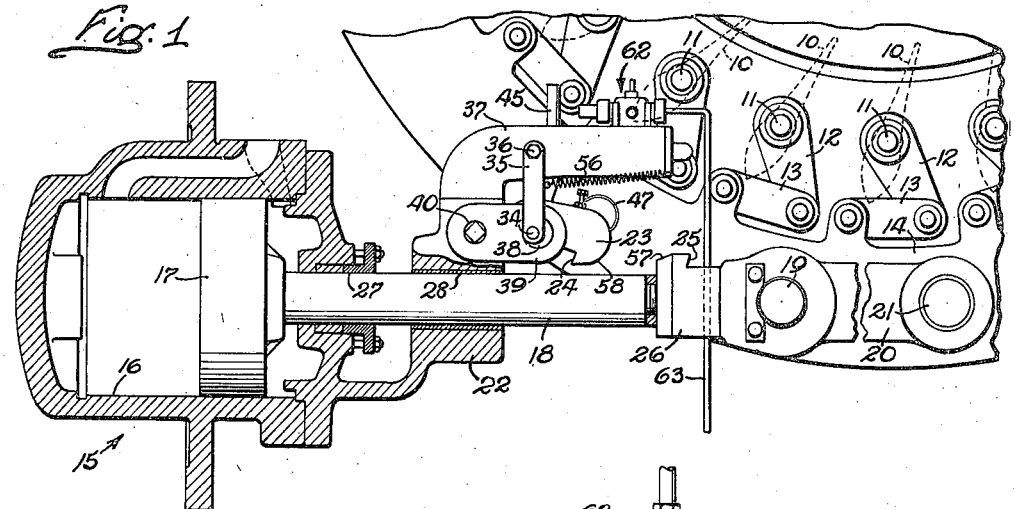

Hydraulic turbines of the character shown in Fig. 1 have wicket gates 10 mounted to swing about pivots 11 and to be moved between open and closed positions by cranks 12 connected through links 13 to a common ring 14 which is oscillated by a hydraulic servo 15 to adjust the gate opening. The servo comprises a cylinder 16 and a piston 17 whose rod 18 is connected through a pivot 19 to a link 20 which, in turn, is pivotally connected at 21 to the ring 14. The latch mechanism constituting the present invention is mounted on a bracket 22 rigid with the servo 15 and comprises generally a pawl 23 having a surface 24 adapted to move in behind and interengage with a shoulder 25 on the fork 26. The latter is screwed onto the threaded end 29 of the piston rod, and supports the connecting rod pivot 19. The stuffing box 27 and a bearing 28 in the bracket 22 guide the shoulder 25 in a rectilinear path across which the shoulder extends. In accordance with the present invention, the pawl is mounted to swing into and out of the path of the shoulder 25 and also is bodily movable along this path so that it may be backed away from the shoulder to relieve friction and enable the pawl to be withdrawn manually.

In the present instance, the hub of the pawl 23 is forked and its ends 30 are received loosely on a shaft 33. The latter has end trunnions 34 pivotally connected to the ends of links 35 which are suspended from their upper ends by pivots 36 screwed into opposite sides of a horizontal arm 37 on the bracket 22. Eccentrics 38 are formed on the shaft 33 adjacent the trunnions 34 and these are received in the forward ends of horizontal links 39. The rear ends of the latter are received on eccentric trunnions 40 on a shaft 41 journaled in the bracket 22 and providing for limited fine adjustment of the pawl longitudinally of the piston rod. In practice, the servo actuator is installed and connected to the gates with the shoulder 25 positioned approximately for engagement with the pawl in the closed position of the gates. Then with the gates 10 closed, the shaft 41 is rocked to shift the pawl mounting endwise until the pawl face 24 comes into full engagement with the shoulder 25 after which holes are drilled through the bracket 22 and the trunnions 40. Pins 42 are inserted in these holes to lock the shaft 41 against turning thereby establishing the proper positional relation between the pawl and the shoulder 25 when the gates are closed.

Intermediate the pawl ends 30, the shaft 33 carries the hub 43 of an arm 44 which projects upwardly and has a handle 45 at its upper end. The hub 43 is secured by a pin 46 to the shaft 33 so that the shaft may be turned by swinging the arm 44. This arm is yieldably connected to the pawl through a spring 47 which is initially stressed to swing the pawl relative to the arm into a limit position (Fig. 2) in which a surface 48 on the pawl engages lugs 49 projecting from the hub 43 of the arm. Herein, the spring is of U-shape having one end bent around a pin 50 between the lugs 49 and the other end fixed by a pin 51 which is supported in the fork of the pawl.

Figure 2:
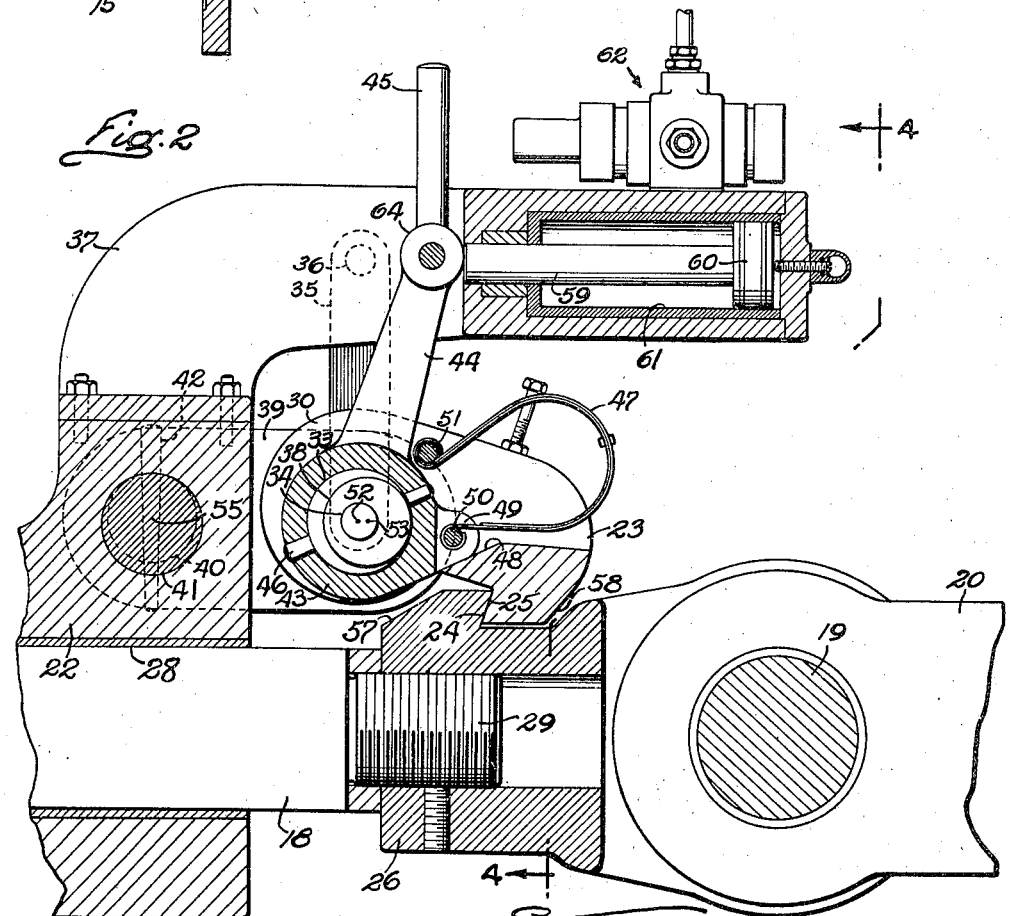
Fig. 2 is a fragmentary sectional view taken substantially along the line 2—2 of Fig. 4.

Assuming that the gates are latched in closed position, the parts will be positioned as shown in Fig. 2, the pawl holding the gates against any tendency to open. In this position, the pivot center 52 of the pawl and the center 53 of the eccentrics 38 lie in a horizontal plane. To relieve the friction between the engaged surfaces 24 and 25 and release the pawl, the handle 45 is swung manually to the left against the action of a tension spring 56. In this motion, the eccentric pivot 53 swings upwardly in an arc about the pivot center 55 of the links 39 and this shift of the center 53 is permitted by shifting of the pawl center 52 to the right and horizontally along an arc whose radius is determined by the length of the links 35. This horizontal shift of the pivot 52 is small but is sufficient to relieve the friction at the latch and shoulder surfaces 24 and 25 and permit the spring 47, which has been further stressed, to raise the pawl out of engagement with the shoulder 25, the lugs 49 having been raised away from the pawl in the movement of the handle.

When the handle is released, it is returned by the spring 56 to reverse the motions above described and bring the parts back to the positions shown in Fig. 1 ready for automatically latching the gates. This takes place when the gates are moved by the servo back to closed position. In approaching this position, an inclined cam surface 57 on the fork engages the pawl 23 at 58 which rides up over the fork end and drops in behind the shoulder 25 under the action of the springs 47 and 56. In this motion, the pivots 52 and 53 move as previously described to shift the pawl relative to the shoulder 25.

The handle 45 may also be actuated under control from a remote point. This is accomplished by the rod 59 of a piston 60 reciprocable in a cylinder to which the flow of fluid may be controlled by a valve 62. The latter may be actuated by pressure fluid delivered through a pipe 63. When pressure is applied to the head end of the cylinder 61, the piston moves to the left as viewed in Fig. 2 and the end of the piston rod bears against the handle at 64 moving the latter to release the pawl 23 in the manner above described.

If desired, the handle 45 may be retained in released position by shifting a detent 65 into the position shown in Fig. 6 after the handle has been actuated. The curved surface of the detent coacting with the handle 45 holds the detent rod 66 against return by a spring 67 until pressure is again applied to advance the handle. Such pressure may be applied by the piston rod 59 whereupon the detent is withdrawn by the spring 67 freeing the pawl for reengagement when the piston is again retracted.

I claim as my invention:

1. Mechanism for latching the reciprocable actuating member of wicket gates comprising a shaft extending transversely of and spaced laterally from the line of reciprocation of said member, a link extending along said line and swingable about a fixed axis parallel to and spaced from said shaft, said link being pivotally connected to said shaft eccentrically of the shaft axis, a second link pivotally connected to said shaft and swingable about an axis disposed on the side of said shaft opposite said member, a shoulder on said actuating member spaced along said line from said shaft when said gates are closed and extending transversely of said line, a pawl pivoted on said shaft and interengageable with said shoulder, an actuating arm fixed to said shaft, and a yieldable connection between said arm and said pawl urging the latter past said shoulder.

2. Mechanism for latching the reciprocable actuating member of wicket gates comprising a shaft extending transversely of and spaced laterally from the line of motion of said member, links pivotally connected to said shaft eccentrically and concentrically respectively and supporting said shaft for some degree of floating along said line when said shaft is turned, a shoulder on said actuating member extending transversely of said line, a pawl mounted on said shaft for interengagement with said shoulder and adapted, on turning of said shaft with the pawl engaging the shoulder, to be backed away from the latter and then swung out of the path thereof, and means for turning said shaft.

3. Mechanism for latching the actuating member of wicket gates comprising a shaft extending transversely of the path of motion of said member, means supporting said shaft for turning about its axis and for some degree of lateral floating as an incident to such turning, a transverse shoulder on said actuating member spaced along said path from said shaft when said gates are closed, a pawl pivoted on said shaft and interengageable with said shoulder, an actuating element fixed to said shaft, and a yieldable connection between said element and said pawl urging said pawl toward said shoulder.

4. Mechanism for latching the actuating member of wicket gates comprising a shaft extending transversely of the path of motion of said member, means supporting said shaft for turning about its axis and for some degree of lateral floating longitudinally of said path as an incident to such turning, a pawl carried by said shaft to shift longitudinally and turn with said shaft, and a yieldable connection having one end movable with said pawl and the other end movable with said shaft.

5. Mechanism for latching the actuating member of wicket gates comprising a shoulder movable with said member and extending transversely of the path of motion thereof, a pawl interengageable with said shoulder, means pivotally supporting said pawl to swing into and out of the path of said shoulder and also for movement along said path, an actuating element swingable about the pawl axis to actuate said pawl supporting means, and a spring providing an angularly yieldable connection between said element and said pawl.

6. Mechanism for latching the actuating member of wicket gates comprising a shoulder movable with said member and extending transversely of the path of movement thereof, a shaft extending transversely of said path, an actuating element fixed to said shaft for turning the latter, a pawl pivoted on said shaft and swingable relative thereto into and out of the path of movement of said shoulder, means providing an angularly yieldable connection between said pawl and element, and means rotatably supporting said shaft and operable on turning thereof in opposite directions to shift the shaft bodily along said path.

7. Mechanism for latching the actuating member of wicket gates comprising a shoulder movable with said member and extending transversely of the path of motion thereof, a pawl interengageable with said shoulder, a swingable actuating element operatively connected to said pawl, means pivotally supporting said pawl for movement into and out of the path of said shoulder during swinging of said element in opposite directions, and means operable in the initial motion of said element when said pawl is engaging said shoulder to back the pawl away from the shoulder.

8. Mechanism for latching the actuating member of wicket gates comprising a shoulder movable with said member and extending transversely of the path of motion thereof, a pawl interengageable with said shoulder, means providing a pivot supporting said pawl to swing into and out of the path of said shoulder to latch and release said member, and means supporting said pivot for bodily movement of the pivot and the pawl along the path of movement of said member to carry said pawl toward or away from said shoulder.

9. Mechanism for latching the actuating member of wicket gates comprising a shoulder movable with said member and extending transversely of the path of the motion thereof, a pawl interengageable with said shoulder, means providing a pivot supporting said pawl for pivotal movement into and out of the path of said shoulder to respectively hold said member against movement or free the latter for movement, means supporting said pivot for bodily movement of the pivot and the pawl longitudinally of the path of said member whereby to carry said pawl toward or away from said shoulder when the pawl is disposed in the path of the latter, and actuating means for said pawl pivot supporting means operable upon movement in one direction to move said pivot to back the pawl away from said shoulder along said path and then swing the pawl out of said path.

CLARENCE L. AVERY.

REFERENCES CITED

The following references are of record in the file of this patent:

UNITED STATES PATENTS

| Number | Name | Date |
|---|---|---|
| 124,472 | Baker | Mar. 12, 1872 |
| 2,277,255 | Rudert et al. | Mar. 24, 1942 |